INVENTOR.
GEORGE F. HITT
NEAL M. RENFRO

BY Townsend and Townsend

ATTORNEYS

July 28, 1970  G. F. HITT ET AL  3,521,916

UNITARY KEYED INSERT BUSHING

Filed Nov. 18, 1968  2 Sheets-Sheet 2

INVENTOR.
GEORGE F. HITT
NEAL M. RENFRO
BY
Townsend and Townsend.
ATTORNEYS

# United States Patent Office 3,521,916
Patented July 28, 1970

3,521,916
UNITARY KEYED INSERT BUSHING
George F. Hitt, Eureka, and Neal M. Renfro, Arcata, Calif., assignors to Humboldt Machine Works, Inc., Arcata, Calif.
Filed Nov. 18, 1968, Ser. No. 776,499
Int. Cl. F16d *1/06*
U.S. Cl. 287—52.05          1 Claim

ABSTRACT OF THE DISCLOSURE

A bushing that has circumferential integrity so that it extends a full 360°. The bushing has at least one axially extending excision for permitting a key to extend from a keyway in a part within the bushing to a keyway in a part without the bushing. The excision does not extend throughout the entire axial extent of the bushing so that a web is formed to preserve the circumferential integrity, and installation and fitting of the bushing is simplified. A key having an excision that corresponds to the web in the bushing so as to retain the bushing in proper position.

---

This invention relates to an inert bushing for a collar or like fitting of the type mounted on a shaft or arbor and adapted to be rotatably driven by the shaft or arbor and adjustably slidable axially of the shaft or arbor.

Although the invention is not to be considered as limited to such environment, it is convenient for the sake of description to describe the invention in conjunction with a saw mill edger, a tool having a plurality of circular saw blades that cut lumber fed therethrough into desired widths. The circular saw blades are carried on a motor driven arbor and the relative position of the blades is adjustable along the arbor so that boards of different widths can be produced. Each blade is mounted on a collar and the collar is internally bushed to afford sliding movement along the arbor. The interior of the collar and the exterior surface of the arbor are formed with keyways so that rotative power can be transferred from the arbor to the collar, and the blade carried thereby, by insertion of a conventional key between the keyways. Typically, two or more keys are provided to transmit the power from the arbor to the collar. The arbor is usually formed of extremely hard material so that wear, if it occurs, occurs in the interior opening of the collar. Such wear permits the collar to wobble on the arbor and causes inaccurate positioning of the saw blade carried by the collar.

Prior art techniques for renewing worn collars are not totally satisfactory. One technique includes building up the worn bearing interior of the collar by bronze welding and then reboring to size. Heat produced during bronze welding distorts the collar and impairs the accuracy and alignment of the collar. Another technique employs a split bushing; such bushing must be constructed to close dimensional tolerances and/or requires a special jig to retain it in place during reinstallation of the collar onto the arbor.

According to the present invention, a one-piece insert bushing is provided which can be readily inserted into worn collars that have been bored out to diameters sufficient to receive the insert bushing. The internal diameter of the bushing is established to afford a sliding fit on the arbor. The bushing has at least one excised portion extending axially thereof so that the necessary key for transmitting force between the arbor and the collar can be installed; the bushing is not, however, totally cut to admit the key. A narrow circumferential web is retained, as a consequence of which the cylindrical form of the bushing is preserved. This is virtually essential in installing the bushing into the collar prior to assembly onto the arbor.

A feature and advantage of the present invention is that the collar, the bushing, and the keys can be installed into a unitary assembly prior to installation onto an arbor. Consequently, specialized jigs and the like are not necessary and the job can be done efficiently and without complication.

The foregoing, as well as other objects, features and advantages, will be more apparent after referring to the following specification and accompanying drawings in which.

Figure 1:
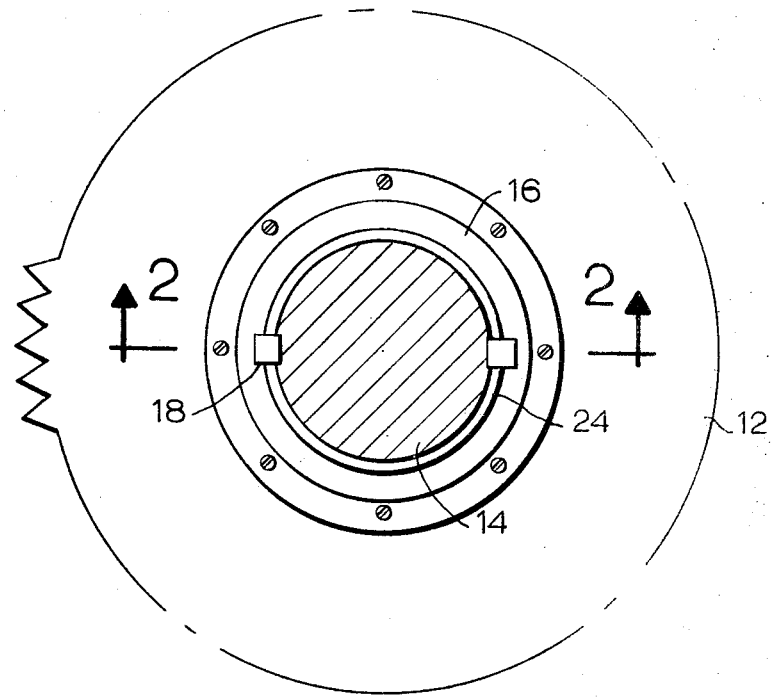
FIG. 1 is an elevation view of an edger saw blade mounted on an arbor in accordance with the present invention.
Figure 2:
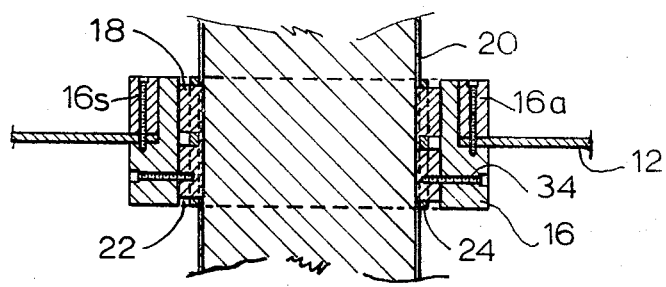
FIG. 2 is a cross-sectional view taken along line 2—2 of FIG. 1.

Referring more particularly to the drawings, reference numeral 12 indicates a saw blade that is carried on an arbor or shaft 14 by means of a collar 16. Collar 16 includes a ring 16a that is secured to the main body of the collar by a plurality of screws 16s. Screws 16s pass through holes in the saw blade 12 and thereby firmly retain the saw blade in the collar. Collar 16 and the structure for securing blade 12 to it are conventional and form no novel part of the present invention.

A key 18 engages a keyway 20 in arbor 14 and a keyway 22 in collar 16 for transmitting power from the arbor to the collar. For permitting the collar 16 to slide axially of arbor 14 an antifriction bushing 24 is fitted between the interior of the collar and the exterior surface of arbor 14.

According to the present invention, bushing 24 includes excised portions 26a and 26b that correspond in circumferential spacing to the circumferential spacing of keyways 20 and 22. Excised portions 26a and 26b are of an axial extent less than the axial extent of bushing 24 so as to form a web 28 that preserves the circumferential integrity of the bushing. Key 18 has a centrally excised portion 30 that corresponds with web 28 so as to span the space between keyways 20 and 22. It has been found that the decrease in strength of the key arising from formation of excision 30 is insignificant. Key 18, at the outer surface thereof, has an interiorly threaded hole 32 that corresponds to a radially extending screw 34 which retains the key into collar 16. Thus, with screw 34 in engagement with the key, bushing 24 is retained in place in collar 16 because of the engagement between web 28 and the walls of the key that define excision 30.

Replacement of a bushing according to the present invention is carried out as follows: the entire structure, including collar 16 and all the parts associated therewith, are slid axially from the end of arbor 14. Screws 34 are removed, which permits removal of key 18. Removal of key 18 frees bushing 24 so that the bushing can be slid out of the collar. A new bushing is then placed in collar 16 with excised portions 26a and 26b in alignment with keyway 22. Because web 28 preserves the circumferential integrity of the bushing, the bushing can be inserted and positioned very quickly and accurately. Keys 18 are slid in place and screws 34 are replaced, thereby securing the keys into the collar. The keys retain the bushing 24 in place within the central bore of the collar. The collar, assembled as described, has no loose parts and can be readily fitted back onto arbor 14, after which operation of the saw can be resumed.

Figure 4:
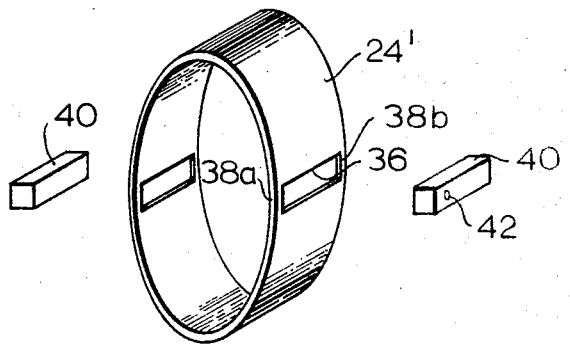
FIG. 4 is an isometric view of another form of the present invention.

FIG. 4 shows a modification of the present invention. In FIG. 4, a bushing 24' has a single excision 36 that is formed medially of the axial extremes of the bushing so as to define two webs 38a and 38b. Webs 38a and 38b preserve the circumferential integrity of the bushing. A key 40 is sized to fit through excision 36 so as to span the distance between keyways 20 and 22. Key 40 has a threaded hole 42 for receiving screws 34 therein. Installation and removal of bushing 24' and key 40 into collar 16 is identical to that described above in connection with bushing 24.

Figure 3:
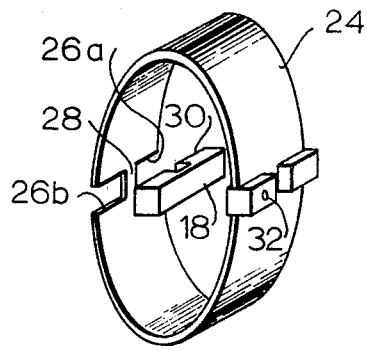
FIG. 3 is an isometric view of one form of bushing according to the present invention.
Figure 5:
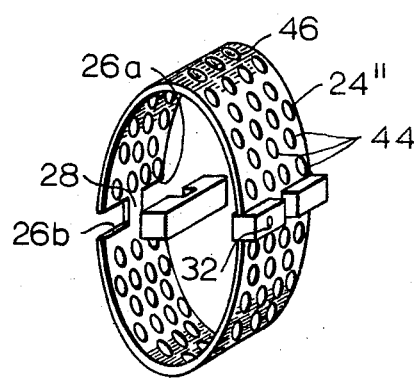
FIG. 5 is an isometric view of still another form of the present invention.

The present invention can also be employed in connection with a ball bushing as shown in FIG. 5 at 24''. Ball bushing 24'' is substantially identical to bushing 24 shown in FIG. 3 except for the presence of holes 44 throughout the surface area thereof, which contain balls 46 which have diameters slightly larger than the thickness of bushing 24''. The balls effect rolling contact with arbor 14 and the internal bore of collar 16 so as to permit movement of the collar axially of the arbor. During installation, the balls are typically retained in place by the presence of thick grease; the existence of web 28 materially simplifies such installation.

Thus it will be seen that the present invention provides a replaceable collar bushing that can be installed quickly without necessitating employment of complicated jigs and the like. The invention can be readily adapted to existing collars simply by boring out the existing bearing material from the collar. The invention has been described hereinabove in connection with an edger saw, but it is not limited to such environment. For example, the invention can be employed in boring machines insofar as such machines require a rotatably driven tool holder to be moved or fed axially of the shaft that drives the tool holder.

Although several embodiments of the invention have been shown and described, it will be obvious that other adaptations and modifications can be made without departing from the true spirit and scope of the invention.

What is claimed is:

1. Apparatus for supporting a collar on a shaft so that the collar rotates with the shaft and is adjustably movable axially of the shaft, comprising a hollow cylindrical bushing of anti-friction material, said bushing having an inner opening sized for sliding fit on the shaft and an outer surface configured for close fit in said collar, said shaft and said collar having complementary keyways therein, a key engageable in said keyways for establishing a driving connection between said collar and shaft, said bushing having an excision therein to permit said key to extend radially directly through said bushing, said excision extending in the axial direction of said bushing by an amount less than the axial extent of said bushing so that a web is retained to preserve the cylindrical form for the full 360° extent of the bushing, said web being formed at one axial extremity of said bushing and wherein a second web is formed at the opposite extremity of said bushing, said key being sized to closely fit intermediate said webs so that said key and said bushing are immovable with respect to one another in the axial direction, a radially extending opening in said collar terminating within the keyway interior of the collar, a portion of the key in alignment with said radial opening having a wall portion defining a hole therein and means adapted to extend through said opening and interengage with said wall to retain said key in place is said collar.

References Cited

UNITED STATES PATENTS

| | | | |
|---|---|---|---|
| 1,251,844 | 1/1918 | Trout | 143—155 |
| 2,337,854 | 12/1943 | Price | 287—52.05 |
| 2,614,832 | 10/1952 | Godfrey | 308—6 XR |
| 2,905,490 | 9/1959 | Trandel | 287—52.05 XR |
| 3,003,830 | 10/1961 | Blazek et al. | 308—6 |
| 3,122,384 | 2/1964 | Luenberger | 287—52.05 XR |
| 3,138,032 | 6/1964 | Raso et al. | 287—52.05 XR |

DAVID J. WILLIAMOWSKY, Primary Examiner

A. V. KUNDRAT, Assistant Examiner

U.S. Cl. X.R.

143—155